United States Patent
Menonna et al.

(10) Patent No.: US 11,541,487 B2
(45) Date of Patent: Jan. 3, 2023

(54) METHOD FOR PRODUCING A CHANNEL IN A SHAFT TUBE

(71) Applicant: Mahle International GmbH, Stuttgart (DE)

(72) Inventors: Antonio Menonna, Ditzingen (DE); Frank Dautel, Gerlingen (DE); Almir Zahirovic, Stuttgart (DE)

(73) Assignee: Mahle International GmbH

( * ) Notice: Subject to any disclaimer, the term of this patent is extended or adjusted under 35 U.S.C. 154(b) by 35 days.

(21) Appl. No.: 17/387,937

(22) Filed: Jul. 28, 2021

(65) Prior Publication Data

US 2022/0056991 A1 Feb. 24, 2022

(30) Foreign Application Priority Data

Jul. 30, 2020 (DE) .......................... 102020209633.3

(51) Int. Cl.
| | |
|---|---|
| *B23P 13/00* | (2006.01) |
| *F16H 53/02* | (2006.01) |
| *F16H 57/04* | (2010.01) |
| *F01M 9/10* | (2006.01) |
| *F01M 1/06* | (2006.01) |

(52) U.S. Cl.
CPC ............. *B23P 13/00* (2013.01); *F01M 9/101* (2013.01); *F01M 9/105* (2013.01); *F16H 53/025* (2013.01); *F16H 57/043* (2013.01); *B23P 2700/02* (2013.01); *F01M 2001/064* (2013.01)

(58) Field of Classification Search
CPC ...... F16H 53/02; F16H 53/025; F16H 57/043; B23P 13/00; B23P 2700/02; F01M 9/101; F01M 9/105; F01M 2001/064
See application file for complete search history.

(56) References Cited

U.S. PATENT DOCUMENTS

| | | | | |
|---|---|---|---|---|
| 4,590,820 A | * | 5/1986 | Hambric | ................... F16H 1/22 |
| | | | | 74/467 |
| 4,930,601 A | * | 6/1990 | Leidecker | ................. F16N 7/36 |
| | | | | 184/6.11 |
| 5,404,845 A | * | 4/1995 | Hannibal | ................. F01L 1/047 |
| | | | | 123/90.16 |

(Continued)

FOREIGN PATENT DOCUMENTS

| | | | |
|---|---|---|---|
| CN | 106763284 A | * | 5/2017 |
| DE | 3206791 A1 | | 11/1983 |

(Continued)

OTHER PUBLICATIONS

Machine translation of DE 3206791 A1 obtained on Jan. 12, 2022.*
German Search Report dated Jul. 22, 2021 related to corresponding German Patent Application No. 102020209633.3.

*Primary Examiner* — Adam D Rogers
(74) *Attorney, Agent, or Firm* — Fishman Stewart PLLC

(57) ABSTRACT

A method for producing a spray channel on a shaft tube, whereby a completed shaft tube can output fluid from within the shaft tube to outside of the shaft tube, the method may include introducing at least one through-opening with a diameter $D_1 \geq 1.5$ mm into the shaft tube and arranging at least one additional element in or on the at least one through-opening such that the spray channel is at least partly formed by the at least one additional element.

13 Claims, 3 Drawing Sheets

(56) References Cited

U.S. PATENT DOCUMENTS

| | | | | |
|---|---|---|---|---|
| 6,705,262 B2* | 3/2004 | Battlogg | ................. | F01L 1/047 |
| | | | | 123/90.26 |
| 10,655,727 B2* | 5/2020 | Grundler | ............. | F16H 57/0427 |
| 10,871,219 B2* | 12/2020 | Akiyama | ............ | F16C 33/1045 |
| 2018/0087644 A1* | 3/2018 | Meusel | ................ | F16H 53/025 |
| 2019/0093754 A1* | 3/2019 | Heki | ................... | F16H 57/0424 |

FOREIGN PATENT DOCUMENTS

| | | | | |
|---|---|---|---|---|
| DE | 3490389 T5 | 10/1985 | | |
| DE | 102014214875 A1 | 2/2016 | | |
| EP | 0301425 A1 * | 2/1989 | ........... | B21D 39/203 |
| JP | 60009803 A * | 1/1985 | ........... | F16H 53/025 |
| WO | 8500864 A1 | 2/1985 | | |

* cited by examiner

METHOD FOR PRODUCING A CHANNEL IN A SHAFT TUBE

CROSS-REFERENCE TO RELATED APPLICATION

This application claims priority to German Application No. DE 10 2020 209 633.3 filed on Jul. 30, 2020, the contents of which are hereby incorporated by reference in its entirety.

TECHNICAL FIELD

The present invention relates to a method for producing a spray channel in a shaft tube. The invention additionally relates to a camshaft having a shaft tube produced according to such a method.

BACKGROUND

In the case of hollow shafts, for example shaft tubes of camshafts, which comprise a specific oil or coolant channel through an interior of the shaft tube, for example for lubricating cams and/or cam followers, through-openings with very small diameter of less than 1.5 mm are often demanded on the shaft tube. Making matters worse is that often these through-openings or bores cannot be introduced at a right angle to the shaft axis, since they are to supply coolant or oil to axially adjacent function elements, such as for example cams. However, through-openings in the shaft tube not running at a right angle to the shaft axis cannot be economically produced with conventional and cost-effective methods, such as for example drilling, punching or drill punching. In fact, such oblique through-openings can only be introduced through very cost-intensive or elaborate methods, such as for example electrochemical metalworking, eroding or laser drilling.

The present invention therefore deals with the problem of producing a shaft tube with at least one spray channel more cost effectively.

SUMMARY

The present invention is based on the general idea of no longer introducing a through-opening serving as spray channel with a diameter $D_1$ of less than 1.5 mm by means of very thin mechanical drills or elaborate methods, such as for example electrochemical metalworking, eroding or laser drilling, but initially producing such a through-opening larger and thus, in terms of production, simpler and more cost-effectively and subsequently provide the same with an additional element which forms at least one part of the spray channel later on. With the method according to the invention for producing a spray channel that is oriented in particular at least in parts obliquely to a shaft axis on a shaft tube, via which with completed shaft tube, fluid, for example coolant or oil, can be output from within the shaft tube to the outside, initially at least one through-opening with a diameter $D_1$ of ≥1.5 mm is introduced into the shaft tube. Introducing such a through-opening is comparatively easily possible even with conventional metal drills, so that the at least one through-opening can be easily and cost effectively produced technically. Following this, at least one additional element is arranged in the method according to the invention in or on the through-opening namely in such a manner that the spray channel is at least partly formed by the additional element. Through the entirely different procedure with the method according to the invention, in which the actual spray channel at least partly no longer runs in the actual shaft tube but in the additional element, the extremely elaborate and thus also expensive production of a spray channel by means of a very thin drilled through-opening directly in the shaft tube that was required to date can be omitted.

In an advantageous further development of the method according to the invention, a through-opening that is oriented obliquely to the shaft axis is initially introduced into the shaft tube, for example drilled in, with a diameter $D_1$ of more than 1.5 mm Following this, a sleeve is pressed into the through-opening, whose inner diameter $D_2$ is <1.5 mm and forms the actual spray channel Thus, the sleeve, which is comparatively easily producible and can likewise be easily cut to length according to a wall diameter of the shaft tube forms the actual spray channel in a shaft tube produced in such a manner.

Alternatively to this it is obviously also conceivable that initially a through-opening oriented orthogonally to the shaft axis is initially introduced into the shaft tube, which again has a diameter $D_1$ of more than 1.5 mm Following this, a cylindrical additional element is pressed into the through-opening which comprises a spray channel running obliquely or parallel to a cylinder axis with a diameter $D_3$<1.5 mm Here, the spray channel in the additional element can likewise be comparatively easily produced by drilling.

In a further advantageous embodiment of the method according to the invention, at least two through-openings oriented orthogonally to the shaft axis having a diameter $D_1$ of ≥1.5 mm are initially introduced into the shaft tube. Such through-openings oriented orthogonally to the shaft axis each with a diameter $D_1$ of more than 1.5 mm can be comparatively easily produced even with conventional metal drills. Following this, an additional element designed as sphere ring having a number of interconnected spheres corresponding to the through-openings on the shaft tube is provided, wherein into each sphere a spray channel running obliquely or orthogonally to a sphere ring axis having a diameter $D_K$ of <1.5 mm will be introduced or is introduced. Following this, the sphere ring is mounted on the shaft tube in such a manner that each sphere at least partly engages in an associated through-opening and fluidically connects the respective spray channel in the sphere with the associated through-opening in the shaft tube. Here, the sphere ring substantially has the form of a chain of pearls, wherein the individual pearls represent the respective spheres. In contrast with a chain of pearls however no sphere with a thread onto which the individual spheres are threaded runs through the individual spheres, but in the sphere ring according to the invention the individual spheres are connected with ring segments arranged in-between, each of which terminate on a sphere surface. Such a sphere ring has at least two spheres, wherein obviously, when introducing four or more through-openings on the shaft tube, four or more spheres can also be provided on the sphere ring. Here, the sphere ring is mounted over the outer diameter of the shaft tube, wherein the individual spheres have a larger outer diameter than the diameter $D_1$ of the respective through-opening and because of this are held in the through-openings. Some spheres can comprise spray channels that are oriented obliquely to the sphere ring axis and some spheres spray channels that are oriented orthogonally to the sphere ring axis, wherein it is also conceivable that spray channels are oriented obliquely or orthogonally to the sphere ring axis.

In a further preferred embodiment of the method according to the invention, at least two through-openings oriented orthogonally to the shaft axis each with a diameter $D_1$ of ≥1.5 mm are practically introduced into the shaft tube. An additional element designed as an outer ring having a number of spray channels preferentially corresponding to the through-openings on the shaft tube running obliquely or orthogonally to an outer ring axis each with a diameter $D_{AR}$<1.5 mm is provided. Following this, an additional element designed as outer ring having a number of spray channels running obliquely or orthogonally to an outer ring axis corresponding to the through-openings on the shaft tube each diameter $D_{AR}$<1.5 mm is provided. The outer ring is now mounted or slid onto the shaft tube in such a manner that at least one spray channel sits on an associated through-opening and/or fluidically connects the same with the associated through-opening. Preferentially, the number of the spray channels in the outer ring corresponds to the number of through-openings in the shaft tube, wherein at the same time an arrangement of the through-openings and of the spray channels in the outer ring is matched to one another so that these can be arranged congruently to one another. In order to be able to achieve a simplified assembly and at the same time a flexible oil supply it can be provided that on an outer lateral surface of the shaft tube an annular groove that is open towards the outside and/or an annular groove on an inner lateral surface of the outer ring that is open towards the inside are/is arranged, wherein the annular groove in the outer lateral surface of the shaft tube connects the individual through-openings, while the annular groove in the inner lateral surface of the outer ring connects the individual spray channels with one another. By way of this it is possible to arrange the outer ring in almost any angle-of-rotation position via the through-openings and still fluidically couple the through-openings with the spray channels.

In a further advantageous embodiment of the method according to the invention, at least two through-openings arranged orthogonally to the shaft axis each with a diameter $D_1$≥1.5 mm are initially introduced into the shaft tube. Following this, an additional element designed as an inner ring with a number of spray channels running obliquely or orthogonally to an inner ring axis preferentially corresponding to the through-openings on the shaft tube each with a diameter $D_{IR}$<1.5 mm is provided. The inner ring is now slid into the shaft tube in such a manner that at least one spray channel is communicatingly connected fluidically with at least one through-opening. In order to be able to likewise achieve an angle independent assembly of the additional element designed as inner ring, a circumferential ring groove can be provided on an outer lateral surface of the inner ring and/or on an inner lateral surface of the shaft tube in the region of the spray channels or of the through-opening, which makes possible transporting oil or coolant from a spray channel either directly through an associated through-opening or indirectly via the ring groove to an adjacent through-opening.

In a further particularly advantageous embodiment of the method according to the invention, at least one through-opening oriented orthogonally to the shaft axis is again introduced into the shaft tube. Preferentially, at least two through-openings oriented orthogonally to the shaft axis are introduced into the shaft tube in order to be able to avoid an unbalance of the shaft tube. Following this, an additional element designed as ring with a front face running obliquely to a ring axis is provided, wherein the front face in the mounted state forms a part of the spray channel. The ring is now mounted onto the shaft tube in such a manner that the oblique front face sits over the at least one through-opening so that the part of the spray channel formed by the front face is fluidically connected with the associated through-opening and makes possible spraying out of liquid, for example coolant or oil obliquely to the shaft axis of the shaft tube. By way of this, a particularly cost effective production of a shaft tube with spray channels running obliquely to the shaft axis is possible.

Further, the present invention is based on the general idea of forming a camshaft with a shaft tube, wherein the shaft tube is produced according to the method in accordance with one of the preceding paragraphs and wherein on the shaft tube a cam is arranged at the same time, which is oriented or arranged relative to the at least one spray channel in such a manner that during the operation it is supplied with oil via the spray channel. By way of this, for example a camshaft with spray channels oriented obliquely to the shaft axis can be technically produced easily and cost effectively.

Further important features and advantages of the invention are obtained from the subclaims, from the drawings and from the associated figure description by way of the drawings.

It is to be understood that the features mentioned above and still to be explained in the following can not only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically.

DETAILED DESCRIPTION

Figure 1:
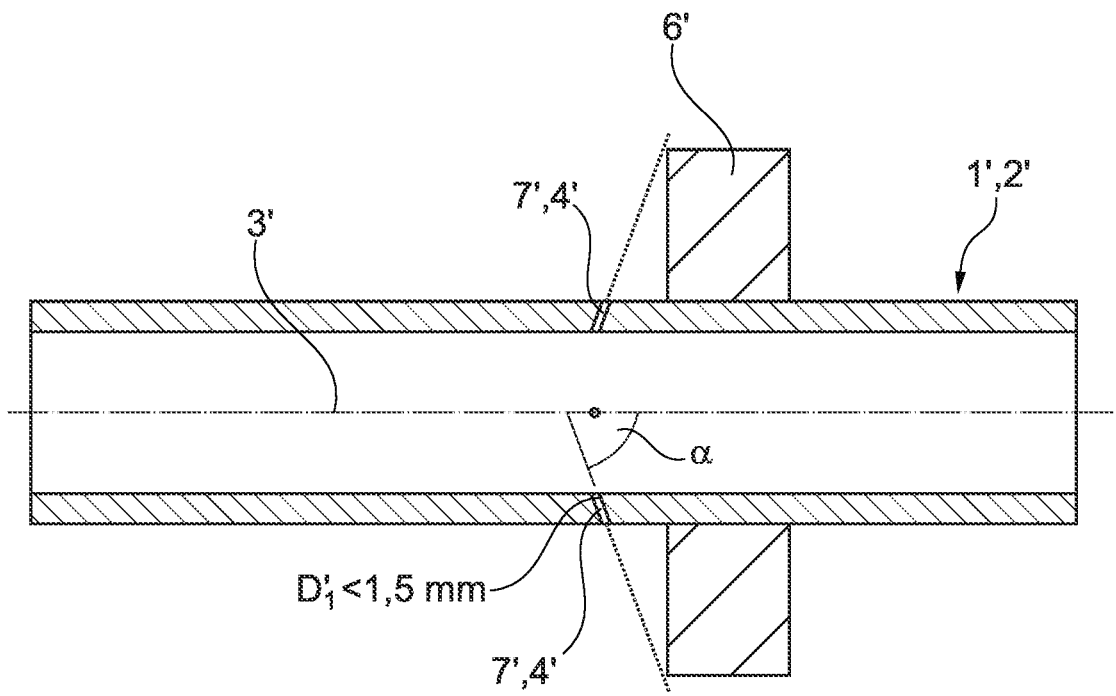
FIG. 1 a shaft tube with a spray channel according to the prior art.

According to FIGS. 2 to 6, a shaft tube 1 according to the invention, for example for a camshaft 2, comprises multiple spray channels 4 which are at least in parts oriented obliquely to a respective shaft axis 3, via which with mounted shaft tube 1, for example with a camshaft 2 mounted in an internal combustion engine, fluid 5, for example oil or coolant, can be output from within the shaft tube 1 to the outside. By way of the oblique arrangement of the respective spray channels 4 axially adjacent cam 6 can be supplied for example with fluid and thus lubricatable or coolable. A connection of the cam 6 with a cam follower that is not shown can also be cooled or lubricated via the fluid jet 5. Obviously, these spray channels 4 can be oriented orthogonally to the shaft axis 3.

In FIG. 1, a shaft tube 1' known from the prior art is shown, in the case of which the respective spray channels 4' with a diameter of $D_1$ of less than 1.5 mm were introduced as through-openings 7' in a jacket tube of the shaft tube 1'. Introducing such small through-openings 7', which additionally run in particular obliquely, i.e. at an angle α of less than 90° to the shaft axis 3', can only take place with extremely elaborate methods, for example electrochemical metalworking, eroding or laser drilling, as a result of which the production of the through-openings 7' and thus also of the spray channels 4' and altogether of the shaft tube 1' or of the camshaft 2' is comparatively elaborate and thus expensive. Even the introduction of through-openings 7' with a diameter of $D_1$ of less than 1.5 mm at a right angle to the shaft axis 3' is difficult.

For this reason, the method according to the invention for producing spray channels 4 on a shaft tube 1 was developed which, compared with the previous production method, is a simple and cost effective design. With the method according to the invention, at least one through-opening 7 with a diameter $D_1 \geq 1.5$ mm is initially introduced into the shaft tube 1. Through the comparatively large diameter $D_1$, conventional metal drills can also be employed without problem and because of this the respective through-openings 7 produced cost-effectively and simple technically. In the shaft tubes 1 shown according to FIGS. 2 to 6, four through-openings 7 each are introduced. Following this, at least one additional element 8 is arranged in or on the through-opening 7 in such a manner that the spray channel 4 is formed by the additional element 8 at least in parts.

The additional element 8 can also be arranged in or on the through-opening 7 so that the spray channel 4 is at least partly oriented obliquely or orthogonally to the shaft axis 3 and because of this a fluid jet 5 emitted from the spray channel 4 includes an angle $\alpha < 90°$ with the shaft axis 3.

The spray channel 4 can be partly arranged or run in the through-opening 7 or in or on the additional element 8.

Here, only the individually possible embodiments of FIGS. 2 to 6 are described in more detail.

Figure 2:
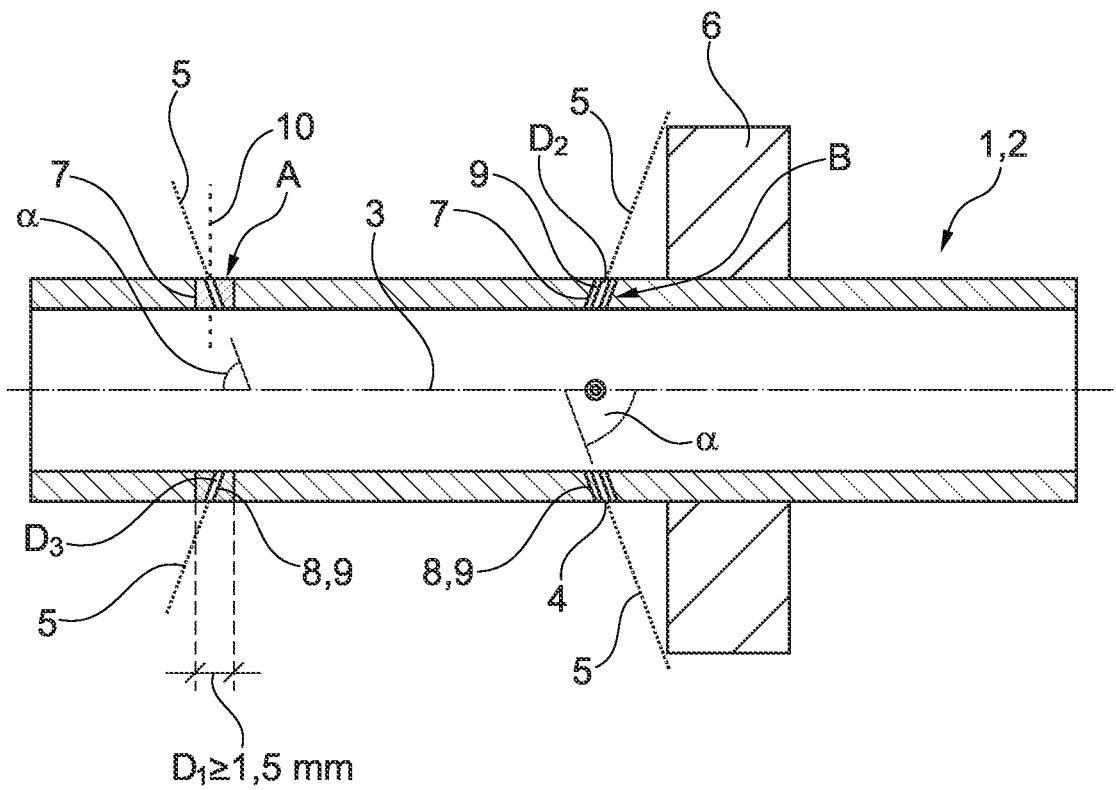
FIG. 2 a shaft tube according to the invention with sleeves arranged in through-openings.

Looking at FIG. 2 it is noticeable that in the detail representation B there through-openings 7 oriented obliquely to the shaft axis 3 have been introduced, for example drilled into the shaft tube 1. Following this, a sleeve 9 is introduced into the respective through-opening 7 with a diameter $D_1$ of $\geq 1.5$ mm, wherein the inner diameter $D_2$ of the sleeve 9 is less than 1.5 mm, for example less than 1.0 mm and forms the actual spray channel 4. Alternatively to this it is also conceivable that a through-opening 7 oriented orthogonally to the shaft axis 3 is introduced into the shaft tube 1, as is shown in the detail representation A of FIG. 2. A cylindrical additional element 8 is now pressed into the respective through-opening 7, which has a spray channel 4 running in particular obliquely or parallel to a cylinder axis 10 with a diameter $D_3$ of less than 1.5 mm, for example less than 1.0 mm. The cylinder axis 10 runs orthogonally to the shaft axis 3, while the spray channel 4 includes an angle $\alpha < 90°$ with the shaft axis 3.

Figure 3:
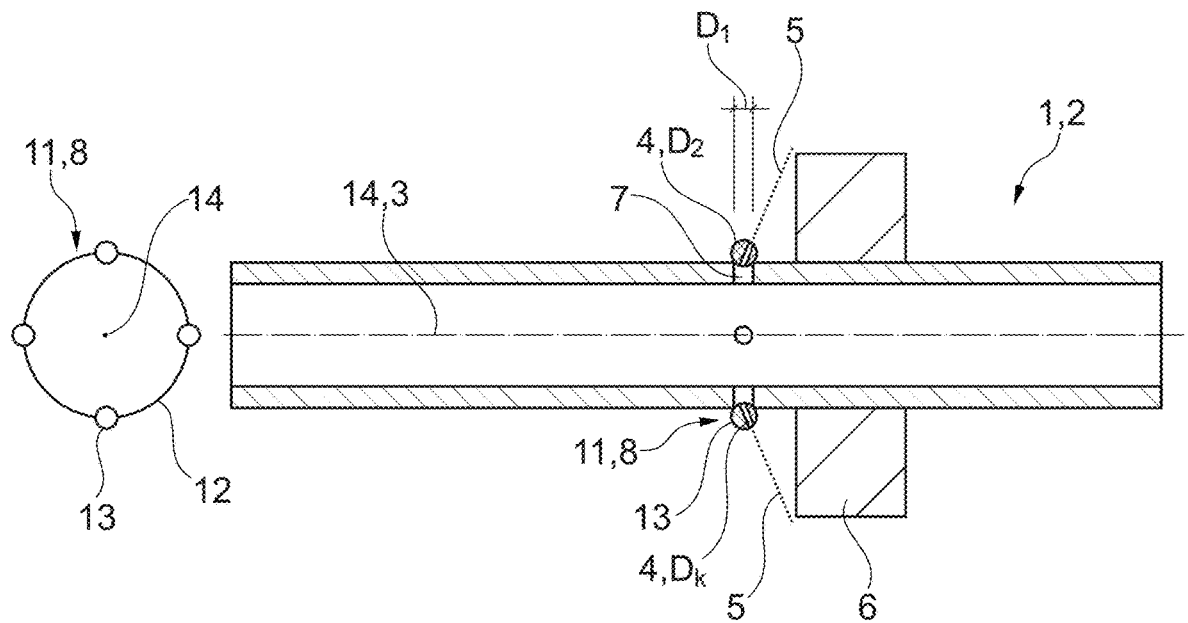
FIG. 3 a representation as in FIG. 2, however with a sphere ring.

Looking at the embodiment according to FIG. 3 it is noticeable that there at least two, preferentially four through-openings 7 oriented orthogonally to the shaft axis 3 again with a diameter $D_1 \geq 1.5$ mm are initially introduced into the shaft tube 1, wherein subsequently an additional element 8 formed as sphere ring 11 with a number of spheres 13 connected to one another via ring segment sections 12 corresponding to the through-openings 7 on the shaft tube 1 is provided, wherein in each sphere 13 a spray channel 4 running obliquely or orthogonally to a sphere ring axis 4 with a diameter $D_K < 1.5$ mm will be introduced or is introduced. By way of this, an oblique or orthogonal emitting of a fluid jet 5 or of fluid 5 and thus a cooling or lubricating of a cam 6 arranged axially adjacent to through-opening 7 is also possible. The sphere ring 11 is mounted on the shaft tube 1 in such a manner that each sphere 13 engages or sits on an associated through-opening 7 and fluidically connects the respective spray channel with the associated through-opening 7. There, some spray channels 4 can be oriented obliquely and some orthogonally to the sphere ring axis 14 or all spray channels 4 can be oriented obliquely or orthogonally to the sphere ring axis 14.

Figure 4:
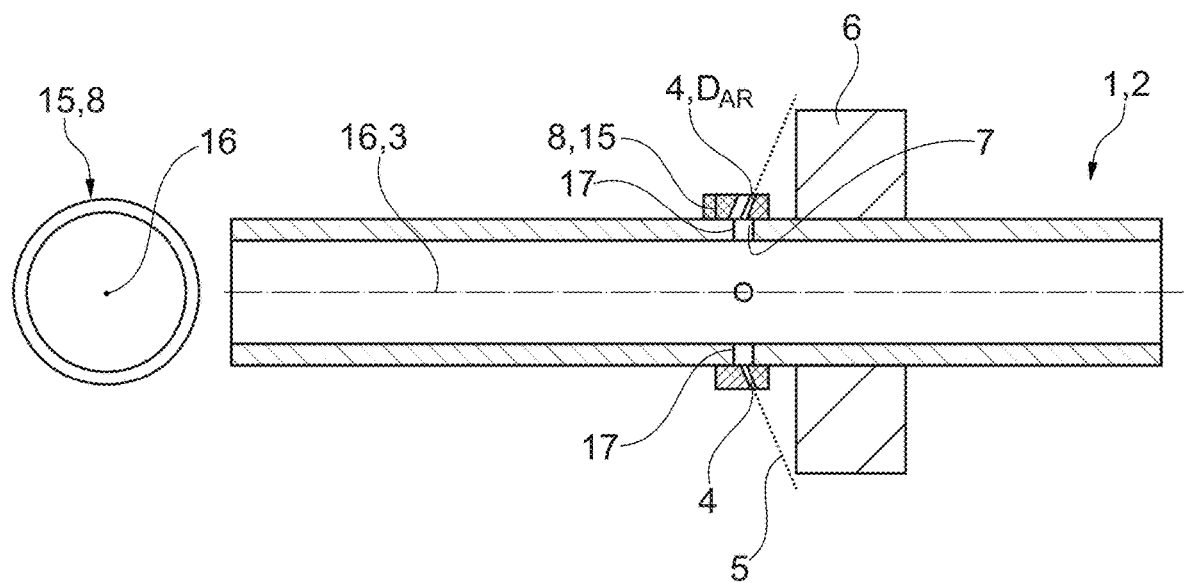
FIG. 4 a representation as in FIG. 3, however with an outer ring.

Looking at FIG. 4 a shaft tube 1 with at least two, preferentially four through-openings 7 oriented orthogonally to the shaft axis 3 is noticeable there, which through-openings 7 where introduced into the shaft channel 1 for example by means of drilling and with have a diameter $D_1 \geq 1.5$ mm. In addition to this, an additional element 8 formed as outer ring 15 according to FIG. 4 with spray channels 4 running obliquely to an outer ring axis 16 each with a diameter $D_{AR} < 1.5$ mm for example less than 1.0 mm, is provided. Alternatively to this, an additional element 8 formed as outer ring 15 with spray channels 4 running orthogonally to an outer ring axis 16 each with a diameter $D_{AR} < 1.5$ mm for example less than 1.0 mm can also be provided. It is likewise conceivable that with an additional element 8 formed as outer ring 15 spray channels 4 running both obliquely and also orthogonally to an outer ring 16 each with a diameter $D_{AR} < 1.5$ mm, for example less than 1.0 mm, are also provided. This means that some spray channels 4 are designed obliquely and some orthogonally to the outer ring axis 16.

The outer ring 15 is now mounted onto the shaft tube 1 in such a manner that at least one, preferentially each spray channel 4 sits on an associated through-opening 7 or is fluidically connected with such. Here, the number of the spray channels 4 arranged in the outer ring 15 can correspond to the number and orientation of the through-openings 7 introduced into the shaft tube 1.

In order to make possible a mounting of the outer ring 15 on the shaft tube 1 that is independent of the angle of rotation it is also conceivable that on an outer lateral surface of the shaft tube 1 a ring groove 17 is arranged. Analogously to this, a corresponding ring groove can also be provided on an inner lateral surface of the outer ring 15, via which fluid 5, for example coolant or oil, is fed from a through-opening 7 via the ring groove 17 to a respective spray channel 4.

Figure 5:
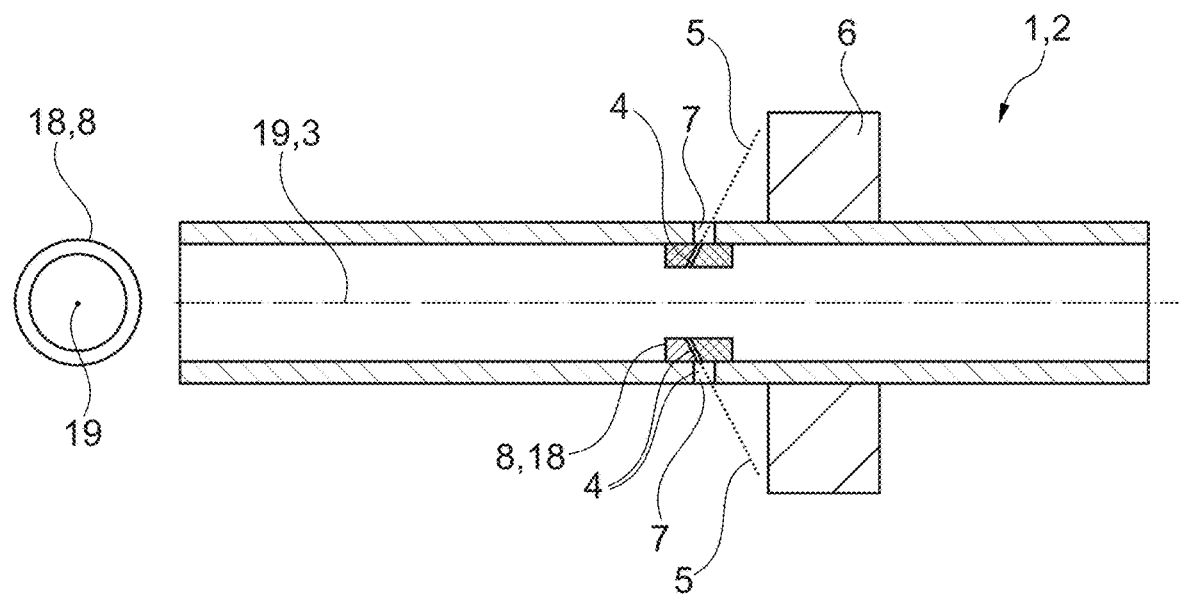
FIG. 5 a representation as in FIG. 4, however with an inner ring.

Analogously to FIG. 4, the shaft tube 1 is formed according to FIG. 5, wherein here the additional element 8 is not formed as outer ring 15, but as inner ring 18. Here, too, at least two, preferentially four or more through-openings 7 oriented orthogonally to the shaft axis 3 are initially introduced into the shaft tube 1, for example drilled in. Here, the through-openings 7 each have a diameter $D_1 \geq 1.5$ mm Following this, the additional element 8 formed as inner ring 18 is provided with a number preferentially corresponding to the through-openings 7 on the shaft tube 1 running obliquely/or obliquely to an inner ring axis 19 each with a diameter $D_{IR} < 1.5$ mm, is provided. Here, some spray channels 4 can be oriented obliquely and some orthogonally to the inner ring axis 19 or all spray channels 4 can be oriented obliquely or orthogonally to the inner ring axis 19. The inner ring 18 is now slid into the shaft tube 1 in such a manner that at least one, preferentially each spray channel 4 from the inside lies against an associated through-opening 7 and/or fluidically connects the respective spray channel 4 with the associated through-opening 7, so that so that the fluid jet 5 or the fluid 5 can leave the shaft tube 1 via the spray channel 4 and the through-opening 7.

Figure 6:
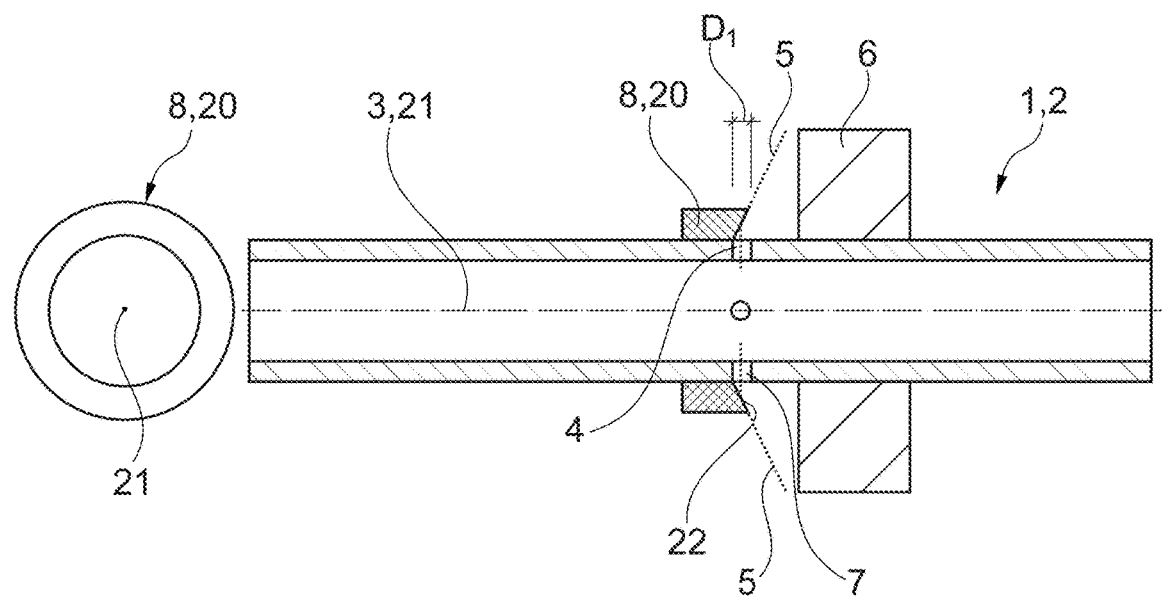
FIG. 6 a representation as in FIG. 4, however with a ring having an oblique front face.

Finally viewing the embodiment of FIG. 6, a shaft tube 1 is noticeable there, in the case of which initially at least 1 through-opening 7 oriented orthogonally to the shaft axis 3 is introduced, for example drilled into the shaft tube 1. These at least one, preferentially four through-openings 7 have a diameter of $D_1$ of ≥1.5 mm and because of this can be comparatively easily produced even by means of conventional metal drills. According to the invention, an additional element 8 designed as ring 20 having a front face 22 running obliquely to a ring axis 21 is now provided or created with the method, wherein the front face 22 in the mounted state forms a part of the spray channel. The ring 20 is now mounted or slid onto the shaft tube 1 in such a manner that the oblique front face 22 sits over the at least one associated through-opening 7 so that the part of the spray channel 4 formed by the front face 22 is fluidically connected with the associated through-opening 7. Since the oblique front face 22 is formed the same everywhere, a mounting on the shaft tube 1 that is independent of the angle of rotation is possible with the ring 20 according to the invention. Producing such a ring 20 is cost-effectively possible comparatively easily, as is the mounting of the same on the shaft tube 1.

With the additional element 8 designed as ring 20 it is likewise possible to emit fluid 5, which is stored in the shaft tube 1 under pressure via the respective through-opening 7 and the oblique front face 22 at an angle $\alpha<90°$ to the shaft axis 3 to the outside and thus lubricate or cool for example axially adjacent cams 6.

On the whole, a shaft tube 1, for a camshaft 2 can be produced with the method according to the invention, which compared with conventional shaft tubes 1 regarding the through-openings 7 and spray channels 4 is not only more cost effective but can also be significantly more easily produced technically.

The invention claimed is:

1. A method for producing a spray channel on a shaft tube, the shaft tube is configured to output fluid from within the shaft tube to outside of the shaft tube via the spray channel, the method comprising:
   introducing at least one through-opening with a diameter greater than or equal to 1.5 mm into the shaft tube; and
   arranging at least one additional element in or on the at least one through-opening such that the spray channel is at least partly formed by the at least one additional element;
   wherein the spray channel is oriented at a right angle or at least partly obliquely to a shaft axis; and wherein the at least one additional element is a sleeve and is pressed into the through-opening to form the spray channel, an inner diameter of the sleeve is less than 1.5 mm.

2. The method according to claim 1, wherein the at least one through-opening is introduced into the shaft tube by drilling, eroding or laser drilling.

3. The method according to claim 1, wherein a cylindrical additional element is pressed into one of the at least one through-opening, the cylindrical additional element including (i) an additional spray channel extending obliquely or parallel to a cylinder axis, and (ii) a diameter less than 1.5 mm.

4. A camshaft having a shaft tube produced according to a method in accordance with claim 1.

5. The camshaft according to claim 4, including at least one cam which is arranged relative the spray channel such that during operation the at least one cam can be supplied with the fluid via the spray channel.

6. A method for producing at least two spray channels on a shaft tube, the shaft tube is configured to output fluid from within the shaft tube to outside of the shaft tube via the spray channels, the method comprising:
   introducing at least two through-openings each with a diameter greater than or equal to 1.5 mm into the shaft tube, the at least two through-openings are oriented orthogonally to a shaft axis; and
   arranging an additional element in or on the at least two through-openings such that the spray channels are at least partly formed by the additional element;
   wherein the additional element is formed as an outer ring, and wherein each of the at least two spray channels includes a diameter less than 1.5 mm.

7. The method according to claim 6, wherein each respective spray channel extends obliquely or orthogonally to an outer ring axis.

8. The method according to claim 6, wherein the outer ring is mounted on the shaft tube.

9. A method for producing at least two spray channels on a shaft tube, the shaft tube is configured to output fluid from within the shaft tube to outside of the shaft tube via the spray channels, the method comprising:
   introducing at least two through-openings each with a diameter greater than or equal to 1.5 mm into the shaft tube, the at least two through-openings are oriented orthogonally to a shaft axis; and
   arranging an additional element proximate the at least two through-openings such that the spray channels are at least partly formed by the additional element;
   wherein the additional element is formed as an inner ring, and wherein each of the at least two spray channels includes a diameter less than 1.5 mm is provided, and each spray channel runs obliquely or orthogonally to an inner ring axis.

10. The method according to claim 9, wherein the inner ring is slid into the shaft tube such that each spray channel of the at least two spray channels from the inside lies against an associated through-opening of the at least two through-openings and/or fluidly connects the respective spray channel with the associated through-opening.

11. A method for producing a spray channel on a shaft tube, the shaft tube is configured to output fluid from within the shaft tube to outside of the shaft tube via the spray channel, the method comprising:
   introducing at least one through-opening with a diameter greater than or equal to 1.5 mm into the shaft tube, the at least one through-opening is oriented orthogonally to a shaft axis; and
   arranging an additional element in or on the at least one through-opening such that the spray channel is at least partly formed by the additional element;
   wherein the additional element is formed as a ring with a front face extending obliquely to the shaft axis, the front face forms a part of the spray channel.

12. The method according to claim 11, wherein the ring is mounted onto the shaft tube such that the front face sits over the at least one through-opening so that the part of the spray channel formed by the front face is fluidly connected with the at least one through-opening.

13. A method for producing at least two spray channels on a shaft tube, the shaft tube is configured to output fluid from within the shaft tube to outside of the shaft tube via the spray channels, the method comprising:
   introducing at least two through-openings each with a diameter greater than or equal to 1.5 mm into the shaft tube, the at least two through-openings are oriented orthogonally to a shaft axis; and
   arranging an additional element in or on the at least two through-openings such that the spray channels are at least partly formed by the additional element;
   wherein the additional element is a sphere ring including at least two interconnected spheres; and wherein into each sphere a spray channel of the at least two spray channels running obliquely or orthogonally to a sphere ring axis with a diameter less than 1.5 mm is disposed; and wherein the sphere ring is mounted on the shaft tube such that each of the at least two interconnected spheres engages an associated through-opening of the at least two through-openings and fluidly connects the respective spray channel with the associated through-opening.

\* \* \* \* \*